United States Patent [19]
Suizu et al.

[11] 3,945,522
[45] Mar. 23, 1976

[54] APPARATUS FOR LOADING GOODS

[75] Inventors: Dairi Suizu; Yasuaki Kato, both of Kakogawa, Japan

[73] Assignee: Okura Yusoki Kabushiki Kaisha, Kakogawa, Japan

[22] Filed: June 26, 1974

[21] Appl. No.: 483,116

[30] Foreign Application Priority Data
Dec. 13, 1973 Japan.............................. 48-140775

[52] U.S. Cl................................ 214/512; 214/38 C
[51] Int. Cl.² ..................... B60P 1/02; B65G 67/02
[58] Field of Search............ 214/38 B, 38 BA, 38 C, 214/38 D, 41, 512

[56] References Cited
UNITED STATES PATENTS

| | | | |
|---|---|---|---|
| 3,337,066 | 8/1967 | Reed et al......................... | 214/38 C |
| 3,454,173 | 7/1969 | Martin .............................. | 214/38 C |
| 3,727,777 | 4/1973 | Hanson............................... | 214/41 |
| 3,836,021 | 9/1974 | McWilliams.......................... | 214/41 |

Primary Examiner—Robert G. Sheridan
Attorney, Agent, or Firm—James E. Nilles

[57] ABSTRACT

Apparatus wherein a conveyer supporting goods to be loaded is moved toward the loading place, and thereafter the conveyer is so driven that the goods on the conveyer are forwardly fed, while at the same time the conveyer is moved backwardly or retracted to thereby transfer the goods successively onto the loading place in the arrayed state as they are on the conveyor.

5 Claims, 10 Drawing Figures

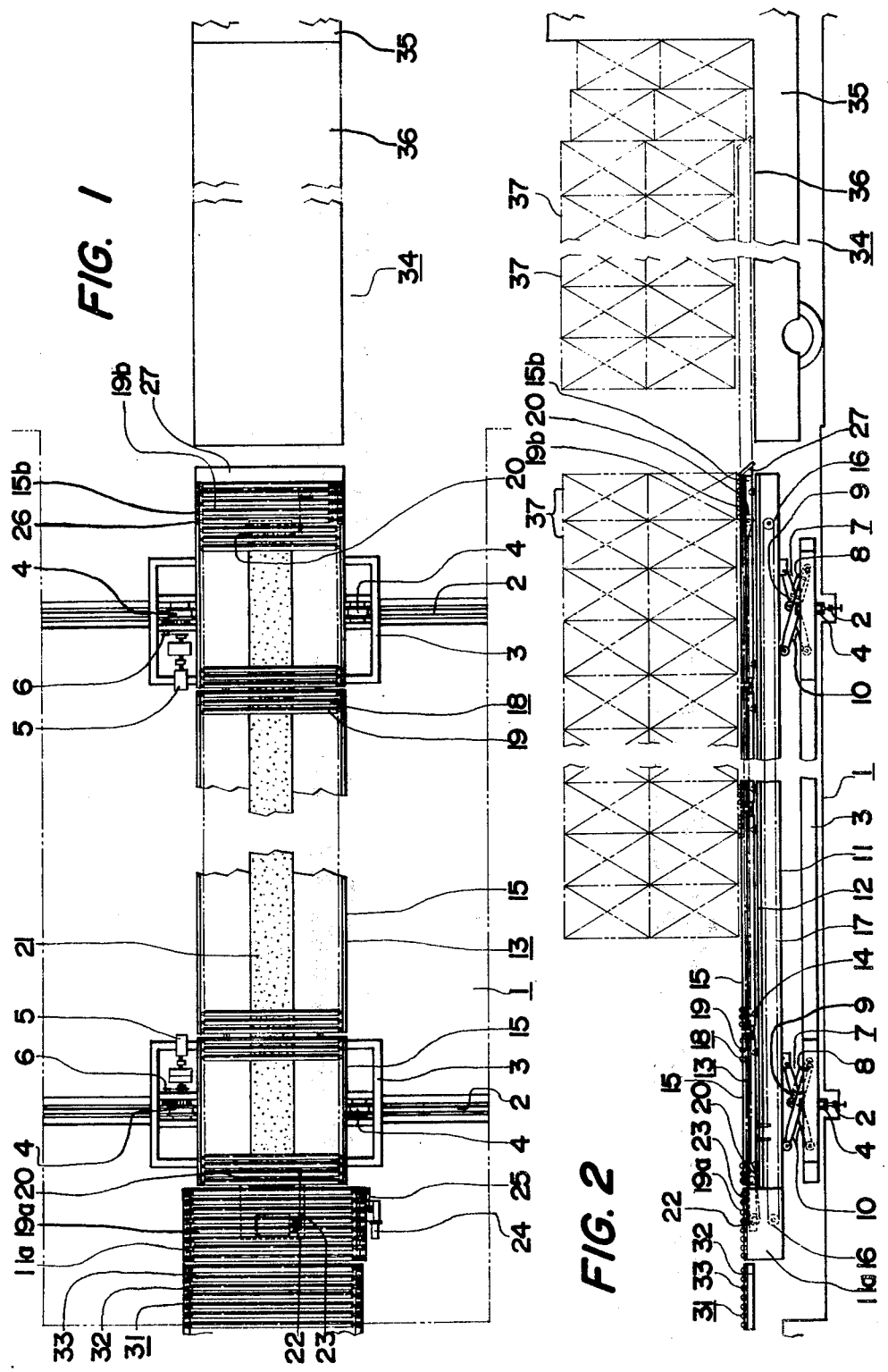

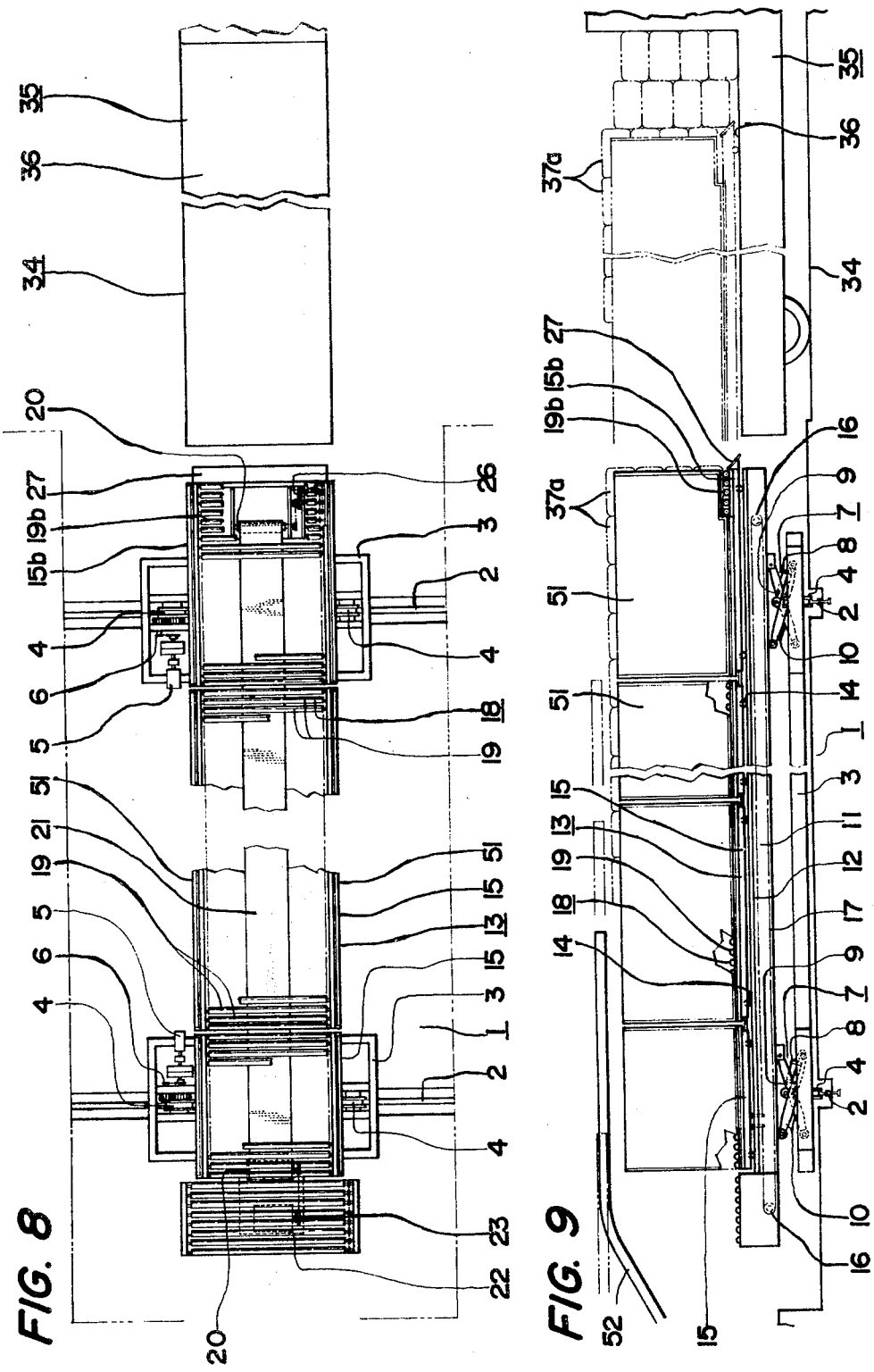

3,945,522

APPARATUS FOR LOADING GOODS

BACKGROUND OF THE INVENTION

The present invention relates in general to an apparatus for loading goods to be transported or shipped and, in particular, to an apparatus for loading the goods onto a loading place of a transporting vehicle such as a truck, container and railroad freight car.

Heretofore, fork lift trucks or the like have been employed for loading the goods to be transported onto a loading place of the truck, container or freight car. However, such a conventional loading method has the disadvantage that man power, and time consuming and troublesome labor are required.

SUMMARY OF THE INVENTION

An object of the invention is therefore to provide an apparatus which is easily operated and capable of loading goods on a loading place of a truck, container, freight car or the like sequentially and in a relatively short time to thereby reduce the man power required for the loading operation.

According to the invention, a conveyer supporting goods to be loaded is moved toward the loading place, and thereafter the conveyer is so driven that the goods on the conveyer are forwardly fed, while at the same time the conveyer is moved backwardly or retracted to thereby transfer the goods successively onto the loading place in the arrayed state as they are on the conveyer.

Another object of the invention is to provide an apparatus for loading goods which allows easy adjustment of the loading positions thereof in vertical and horizontal planes so as to be matched with the height or lateral position of the loading place, to thereby facilitate the loading of goods.

Still another object of the invention is to provide an apparatus which can smoothly transfer the goods from a carrier conveyer onto a loading place.

A further object of the invention is to provide an apparatus which can perform the loading work smoothly, even if a gap should exist between the loading apparatus and the place to be loaded with goods such as the rear body of a truck, container, freight car or the like.

A further object of the invention is to provide an apparatus which can load goods packed in bags as well as box-like articles.

The above and other objects as well as novel features and advantages of the invention will become apparent from the following detailed description of preferred embodiments of the invention. The description makes reference to the drawings.

BRIEF DESCRIPTION OF THE DRAWINGS

FIG. 1 is a plan view showing an embodiment of a loading apparatus according to the invention with portions broken away;

FIG. 2 is a side view of FIG. 1 with portions broken away;

FIG. 8 is a partially broken away plan view showing a further embodiment of the loading apparatus according to the invention;

FIG. 9 is a side view of FIG. 8 with portions broken away; and

DETAILED DESCRIPTION OF THE INVENTION

Figure 3:
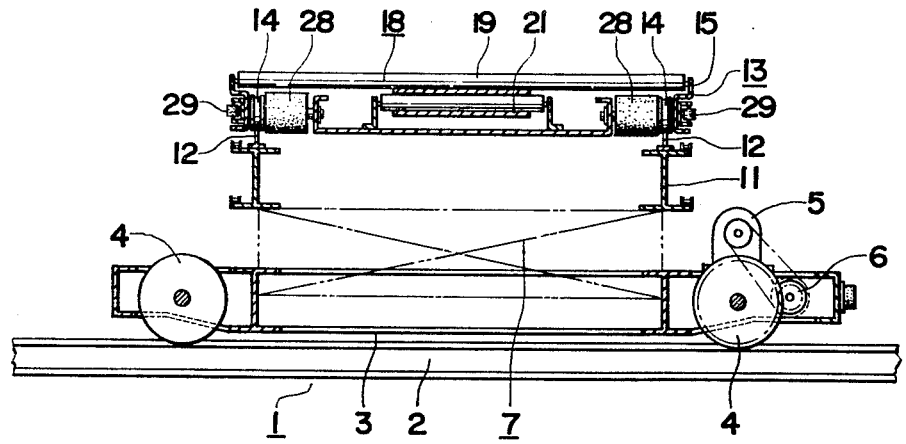
FIG. 3 is a sectional view of FIG. 1.
Figure 4:
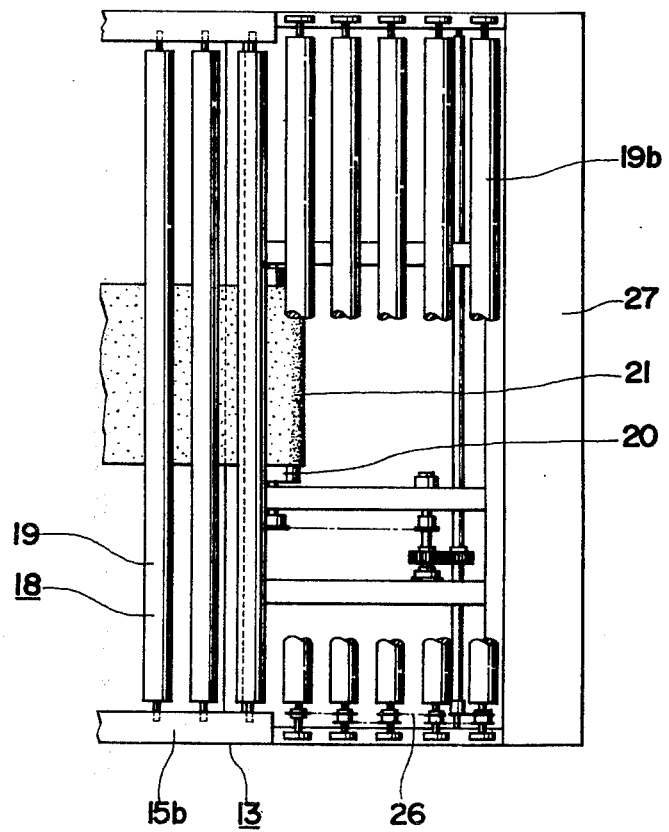
FIG. 4 is a plan view of a front portion of a carrier assembly used in the embodiment of FIG. 1 shown with portions broken away.
Figure 5:
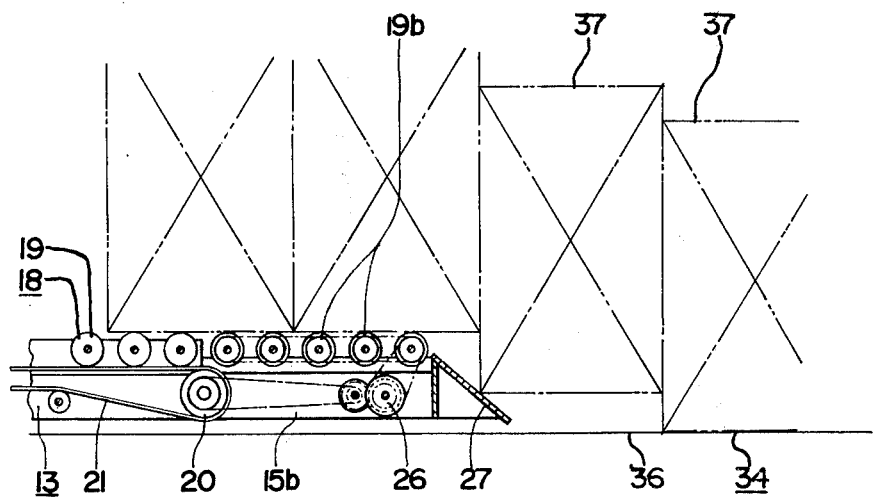
FIG. 5 is a sectional view of FIG. 4.

Now, the invention will be described at first with reference to FIGS. 1 to 5 which show a preferred embodiment of the invention.

Reference numeral 1 denotes an elongated foundation platform on which a plurality of rails 2 are fixedly laid transversely of the platform 1 and in parallel with one another. Carriages 3 are supported transversely movably on the respective rails 2 through wheels 4 pivotally mounted on the associated carriage at both sides thereof. A reversible electric motor 5 mounted on each of said carriages 3 is operatively coupled to one of the wheels 4 at one side of the carriage by way of a transmission apparatus 6. In this manner, the carriages 3 can be reciprocatively moved on the rails 2 transversely of the foundation platform 1 by driving the respective electric motors 5 to thereby rotate the wheels 4 through the transmission apparatus 6.

A plurality of vertically extensible and collapsible lift structures 7 are provided on every carriage 3, each of which structures comprises a hydraulic cylinder 8 having a base or lower portion pivotally connected to the carriage 3 and provided with a piston rod 9, and lift arms 10 each having a lower end pivoted to the carriage 3 and an upper end pivotally connected to a vertically movable support body 11. It will be noted that said lift arms 10 are pivotally connected to each other at an intermediate portion thereof to thereby cross each other, and the piston rod 9 of the hydraulic cylinder 8 is pivotally connected to the lift arms 10 at said intermediate portion thereof. The vertically movable support body 11 can be selectively lowered or lifted by the corresponding reciprocating movement of the piston rod 9 of the hydraulic cylinder 8 through the lift arms 10.

Rails 12 are mounted on the vertically movable support body 11 at both sides thereof extending longitudinally of the foundation platform 1 in parallel with each other. Disposed movable along the longitudinal axis of the elongated foundation platform 1 on the rails 12 through a plurality of wheels 14 is a load carrier assembly generally indicated by numeral 13 and comprising a plurality of support frames 15 successively arranged in the longitudinal direction and connected vertically swingably to one another. Sprocket wheels 16 are rotatably mounted on the vertically movable support body 11 at front and rear ends thereof and a chain 17 extends between and around the sprockets 16, both ends of said chain 17 being connected to the above mentioned load carrier assembly 13. By driving the sprocket wheels 16 through a reversible electric motor (not shown), the load carrier assembly 13 may be reciprocatively moved on the rails 12 along the longitudinal axis of the elongated platform 1.

The load carrier assembly 13 comprises a conveyer 18 composed of a plurality of rollers 19 rotatably mounted on the upper surfaces of the support frames 15 in juxtaposition to one another. Pulleys 20 are rotatably mounted on the intermediate lower portion of each of the support frames 15 at the front and rear ends of the longitudinally reciprocatable load carrier assembly 13 and an endless belt 21 is so suspended between the pulleys 20 that the upper surface of the upper running portion of the belt 21 may bear against the lower peripheries of the rollers 19. One of the pulleys 20 is operatively connected to a reversible electric motor 22 by way of a reduction gear apparatus or transmission 23. In this manner, the rollers 19 may be rotated in either directions due to the frictional contact with the belt 21, when the electric motor 22 is energized to rotate the pulleys 20 through the transmission 23.

Rotatably mounted on a frame 11a positioned at the rear portion of the vertically movable support body 11 succeeding to the rollers 19 of the conveyer 18 in juxtaposition thereto are rollers 19a which are adapted to be rotated by an electric motor 24 through a transmission apparatus 25, both of which are securely mounted on the frame 11a. Further mounted rotatably freely on a front frame 15b of the support frames 15 of the assembly 13 are a plurality of rollers 19b which are operatively coupled to the aforementioned pulley 20 through a transmission apparatus 26 and adapted to be rotated at a higher speed than the rollers 19. A guide plate 27 is provided at the front end portion of the load carrier assembly 13 in front of the conveyer 18, said plate 27 slanting down forwardly.

As can be seen in FIG. 3, additional rollers 28 formed of a material such as gum or the like and having a greater diameter than the wheels 14 are rotatably mounted on each of the support frames 15 below the lower surfaces and at both sides thereof. Further, guide rollers 29 of a similar material are provided at both sides of each frame 15.

A feed-out conveyer 31 is provided at the rear portion of the foundation platform 1. This conveyer 31 comprises a plurality of driving rollers 33 supported rotatably freely on a frame structure 32 in juxtaposition to one another. An entry and exit station 34 is arranged for transport vehicles in front of the foundation platform 1.

Reference numeral 35 denotes an autotruck having a rear body 36 which is to be loaded with goods 37 to be transported or shipped.

In operation, goods to be transported which are fed on the rollers 33 of the feed-out conveyer 31 are transferred onto the conveyer 18 of the longitudinally movable load carrier assembly 13 and moved forwardly by driving the rollers 19 and 19a in the corresponding direction, which are stopped when a predetermined quantity of goods 37 to be transported have been loaded on the conveyer 18.

Subsequently, the carriages 3 are moved transversely of the foundation platform 1 so as to be horizontally aligned with the loading position of the rear body 36 of the autotruck 35 which is in the stand-by position at the entry and exit station 34. Additionally, the lift structures 7 are actuated to thereby move the support body 11 in the vertical direction so that the lower level of the load carrier assembly 13 may be in vertical alignment with the rear body 36 of the autotruck 35.

Thereafter, the load carrier assembly 13 is moved forwardly onto the rear body 36 of the truck 35, whereby the wheels 14 mounted on the frames 15 of the carrier assembly 13 are disengaged from the rails 12 and the rollers 28 run on the loading surface of the rear body 36 of the truck 35 until they have been reached to the front side of the rear body 36.

Next, the rollers 19 of the conveyer 18 are driven again to thereby feed the goods 37 thereon forwardly with the carrier assembly 13 being moved rearwardly. At that time, if the speed of the goods 37 fed by driving the rollers 19 of the conveyer 18 is the same as the speed of the rearward movement of the carrier assembly 13, the goods 37 to be transported are successively transferred onto the loading surface of the rear body 36 by way of the guide member 27 while the goods 37 remain substantially in the same positions relative to one another. The goods 37 to be transported can be smoothly fed out onto the loading surface of the truck if the front rollers 19b of the conveyer 18 are driven at higher speed than the rollers 19. When all the goods 37 have been loaded on the truck, the load carrier assembly 13 may be returned to the starting position.

Figure 6:
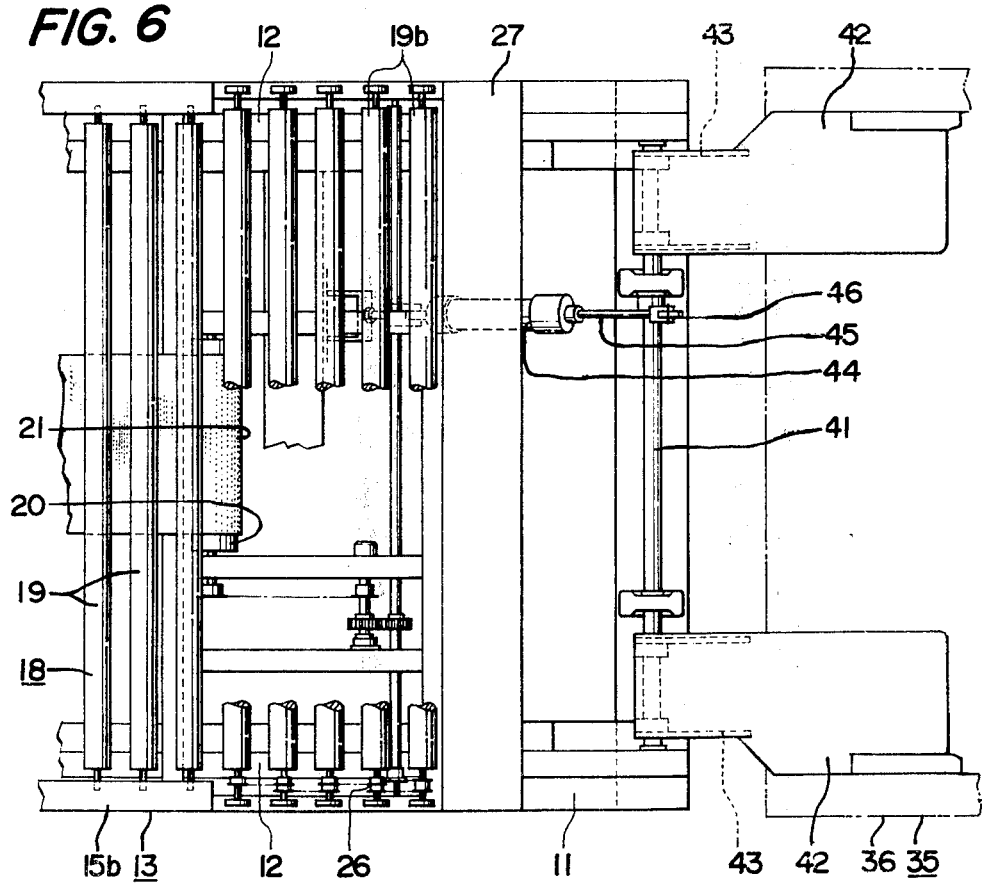
FIG. 6 is a plan view similar to FIG. 4 but showing another embodiment of the load carrier assembly.

Another embodiment of the invention will be described hereinafter with reference to FIGS. 6 and 7.

In this embodiment, the vertically movable support body 11 as hereinbefore described is provided with a rotatable shaft 41 extending transversely at the front side of the support body 11. Guide plates 42 are fixedly secured to the shaft 41 at both sides thereof by means of supporting frames 43 in positions corresponding to those of the guide rollers 28 hereinbefore described with reference to FIGS. 1 to 5. A hydraulic cylinder 44 is pivotally connected to the front lower portion of the support body 11, while a piston rod 45 of said cylinder 44 is pivoted to a connecting rod 46 at one end thereof, the other end of which is fixedly secured to the rotatable shaft 41. By actuating the cylinder 44 to reciprocate the piston rod 45, the shaft 41 is rotated by way of the connecting rod 46, as a result of which the guide plates 42 are swung. These guide plates 42 are usually set in the erected positions as indicated by phantom line in FIG. 7.

Figure 7:
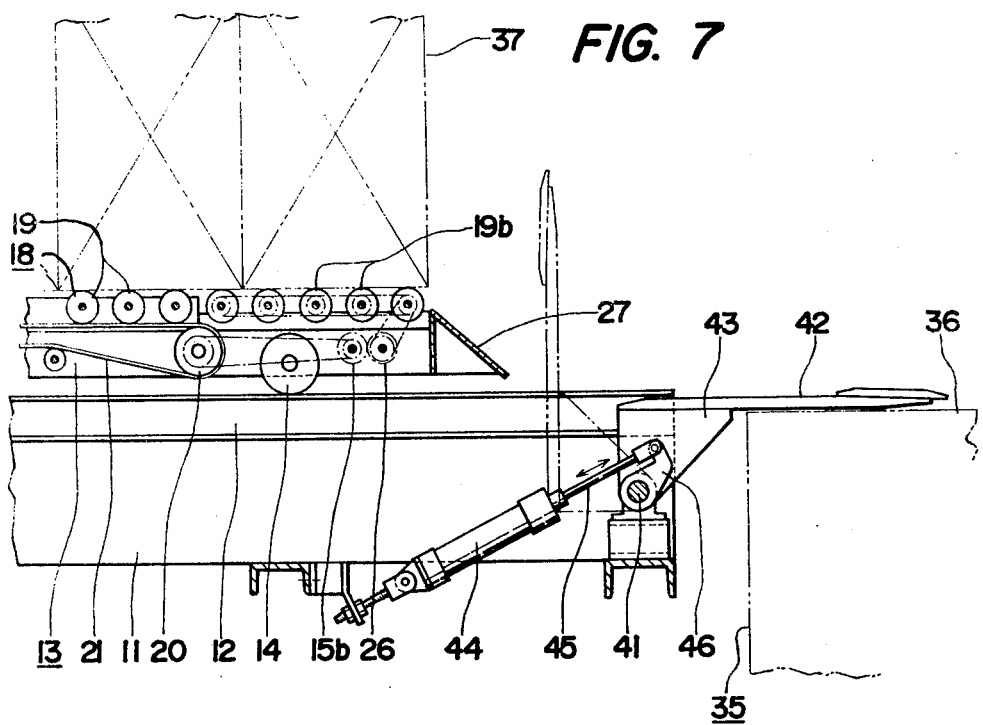
FIG. 7 is a sectional view of FIG. 6.

In operation, after the carriages 3 and the vertically movable support body 11 have been operated so that the lower level of the load carrier assembly 13 is positioned in alignment with the loading surface of the rear body 36 of the truck 35, the guide plates 42 provided at the front side of the vertical movable support body 11 are rotated from the position depicted in FIG. 7 by the double dot-and-dash line to the position indicated by solid line to be laid on the rear end of the rear body 36 of the truck 35 in a bridge-like manner. Subsequently, the load carrier assembly 13 is moved forwardly, whereby the wheels 14 thereof are dismounted from the rails 12 and the rollers 28 then can ride on the loading surface or rear body 36 of the truck 35 by way of the now horizontally positioned guide plates 42.

The above described embodiment has an advantage that the load carrier assembly 13 can be easily placed on the rear body 36 of the truck 35, even if a gap should occur between the front side of the vertically movable support body 11 and the rear end of the loading body 36 of the truck 35.

Figure 10:
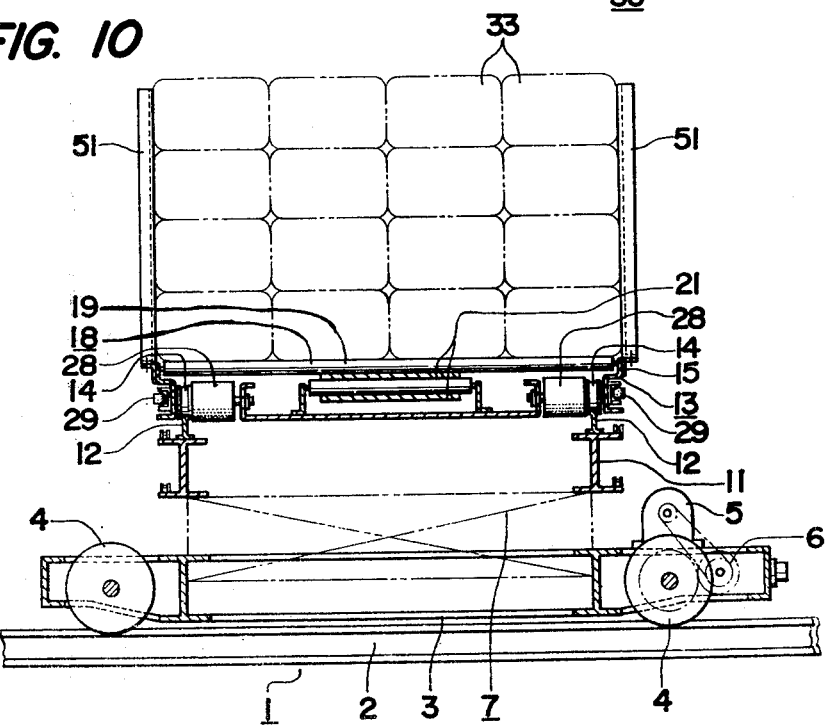
FIG. 10 is a sectional view of FIG. 8.

FIGS. 8 to 10 show still another embodiment of the invention.

In this embodiment, the frames 15 of the load carrier assembly 13 are provided with vertical guide plates 51. An extensible transport conveyer 52 composed of, for example, a conventional belt conveyer is disposed over the load carrier assembly 13 in such a manner that the conveyer 52 may be moved both vertically and transversely or laterally. In operation, the conveyer 52 is at first so extended that the loading end thereof is positioned over the front portion of the load carrier assembly 13. Then the conveyer 52 is driven to thereby feed goods 37a to be transported or shipped such as packaged goods, which may freely drop from the free end of the conveyer 52 on the conveyer 18 of the carrier assembly 13 or alternatively may be manually handled to be placed on the conveyer 18 between the guide plates 51 successively from the front to the rear side, while the conveyer 52 is simultaneously retracted, until a predetermined quantity of the goods 37a have been supported on the conveyer 18. In this manner, goods such as those packed in bags can be easily loaded on the truck.

In the foregoing description, preferred embodiments of the invention have been described and illustrated in the drawings. However, it should be appreciated that many changes and modifications may be made without departing from the scope and spirit of the invention. Accordingly, the invention should neither be restricted to these embodiments nor interpreted in any restrictive sense.

What is claimed is:

1. A loading apparatus for loading goods onto a receiving surface comprising: a horizontally movable carriage, a horizontally disposed support means secured to said carriage, means for elevating said support means, said elevating means including lifting arms pivotably connected in a crisscross manner, said support means mounted above and connected to said carriage by said elevating means, load carrier means supported on said support means, means for supporting said load carrier means and for causing horizontal movement to said support carrier means with respect to load carrier means to convey said load carrier means onto and away from said receiving surface, said load carrier means including a conveyor means forming a conveyor surface, said conveyor means including a plurality of transversely disposed parallel rollers driven by a belt disposed below said rollers in driving engagement therewith, said conveyor means being operable to support said goods and to convey said goods onto said receiving surface as said load carrier means is reciprocated away from said receiving surface, means extending between said support means and said receiving surface for supporting said load carrier means as said load carrier means is conveyed onto and away from said load carrier means, said means extending between said support means and said receiving surface including a guide means provided at the front of said support means to guide said load carrier means onto said receiving surface and a driving means for swinging said guide means so as to be set in an erect position when said guide means is not used and to be laid on said receiving surface when it is used.

2. Apparatus as set forth in claim 1, wherein said load carrier means is divided into a plurality of sections which are swingably coupled to one another.

3. Apparatus as set forth in claim 1, wherein a guide plate is provided at the front of said conveyer means to guide said goods fed from said conveyer means to said loading place.

4. The loading apparatus as set forth in claim 1 wherein the means for causing horizontal movement of said load carrier means includes a pair of horizontally disposed tracks rigidly secured to said support means and driven wheels rotatably connected to said load carrier means and riding on said tracks.

5. The loading apparatus set forth in claim 1 further comprising guide rollers attached to said load carrier means at both sides thereof and adapted to support said load carrier means on said receiving surfaces.

* * * * *